United States Patent [19]

Miller

[11] 3,889,539
[45] June 17, 1975

[54] DIP TYPE MEASURING DISPENSER

[76] Inventor: Owen A. Miller, 4732 E. National Rd., Springfield, Ohio 45505

[22] Filed: Mar. 29, 1973

[21] Appl. No.: 346,105

[52] U.S. Cl. .......................... 73/425.4 R; 73/425.4
[51] Int. Cl. ............................................. G01n 1/12
[58] Field of Search ............ 23/259, 292; 73/425.2, 73/425.4; 222/356, 465; 141/110

[56] References Cited
UNITED STATES PATENTS

| 936,757 | 10/1909 | Butts, Jr. ........................ 73/425.4 P |
| 2,485,492 | 10/1949 | Hubbard ........................... 73/425.4 |
| 3,765,248 | 10/1973 | Ramachandran ................. 73/425.4 |

*Primary Examiner*—S. Clement Swisher
*Attorney, Agent, or Firm*—Jerome P. Bloom

[57] ABSTRACT

A measuring dispenser in the nature of a small bore dip tube which is particularly shaped to facilitate its use by individuals who have poor vision or unsteady hands. In preferred embodiment the dispenser is formed of shaped tubing including an intermediate straight section and reversely curved end sections forming U-shaped measuring segments, each terminating at its open lip with a stabilizing catch portion.

10 Claims, 4 Drawing Figures

PATENTED JUN 17 1975 3,889,539
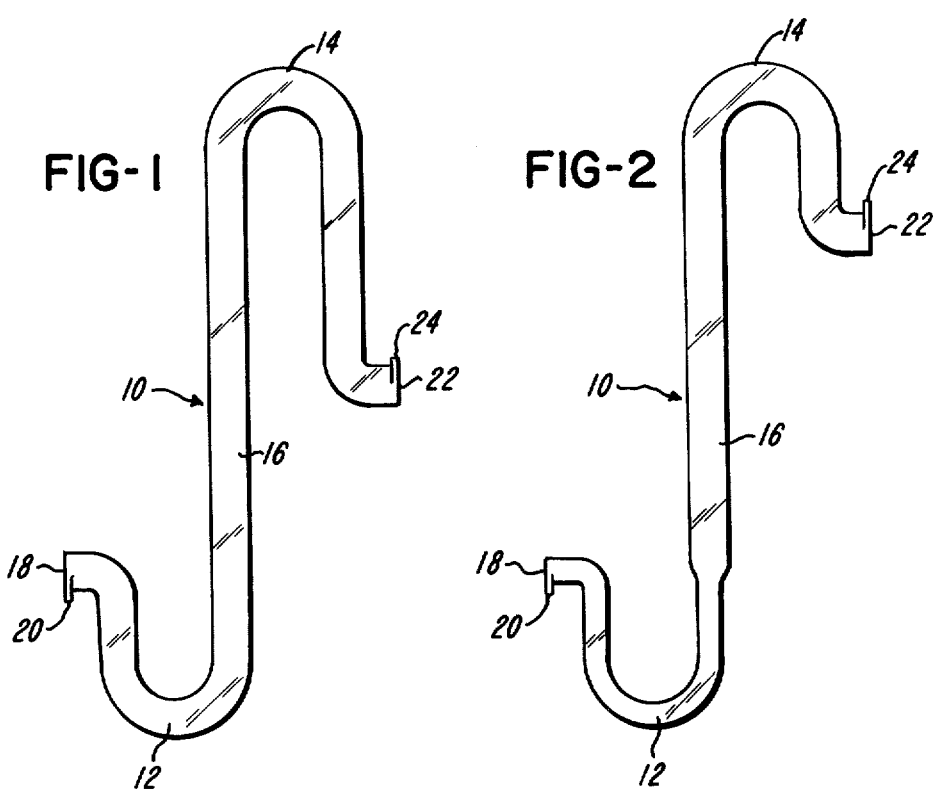
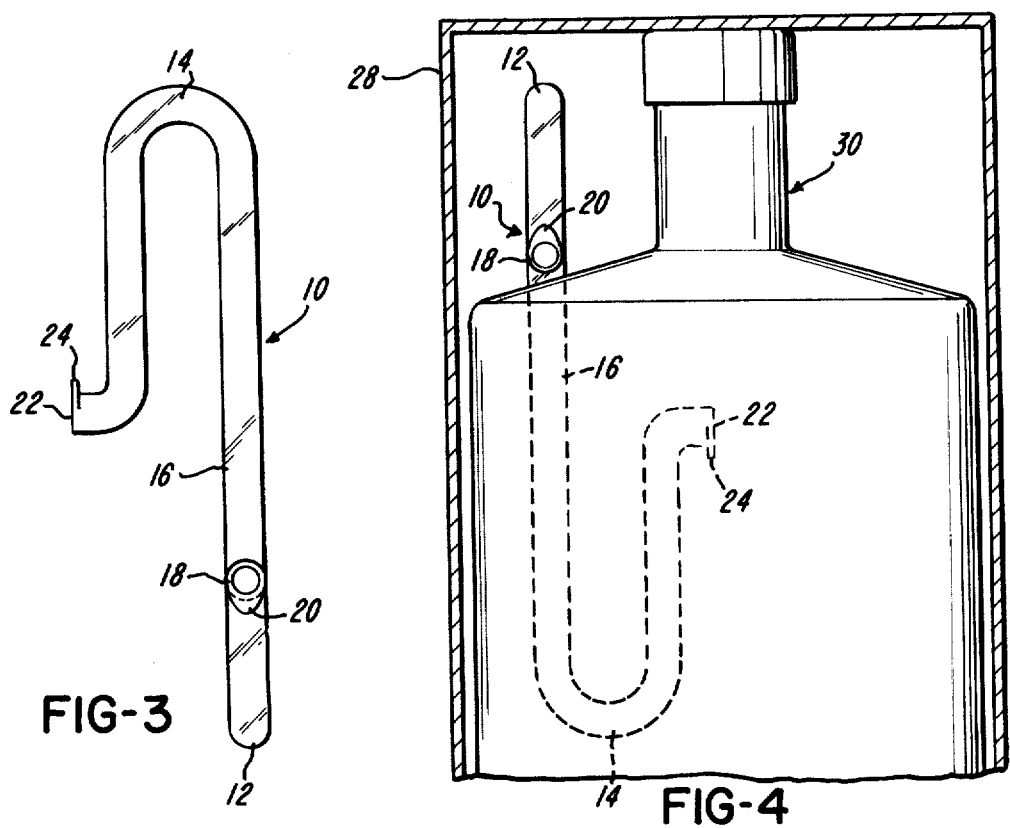

DIP TYPE MEASURING DISPENSER

BACKGROUND OF THE INVENTION

This invention relates to a dip type measuring dispenser designed for use by the physically handicapped. It is particularly useful, for example, in home testing procedures necessary to the health, as in conducting the frequent tests of urine specimens required of diabetics who must continuously watch for danger signs which may be evidenced in the urine. The invention will be described with this in mind though obviously not so limited in application.

In checking his urine samples the diabetic normally introduces his urine into one container and then must transfer a measured amount thereof to another. He also must introduce a measured amount of water. Packaged chemicals are provided in tablet form, the introduction of which in the measured urine and water samples determines the existence or nonexistence of a dangerous level of sugar in the urine. It will be obvious that the proportional relation of the urine to the water and to the chemical is critical to this test procedure.

While the procedure above described is simple, often times the individual will have physical problems evidenced by shaky hands or poor vision. It is for this reason the most conventional measuring devices will be difficult for him to use. Spillage of urine or water often occurs in such cases, as in the course of transferring a measured amount of urine from one container to the other. Also determining the proper amount of liquid or water to be transferred, can be very difficult for some people to achieve. The present invention is directed to obviating the noted problems as well as producing a simple measuring dispenser having general utility.

SUMMARY OF THE INVENTION

The present invention in preferred embodiment is achieved by taking a straight section of plastic or glass tubing and shaping each end to produce thereon a generally U-shaped measuring segment. Further benefit is lent this structure by forming a catch position on the open lip of each measuring segment. The latter is provided to enable a person to stabilize the measuring dispenser in discharging its contents.

It is also contemplated, in accordance with the invention that the respective measuring segments may differ in capacity and be particularly directed to facilitate the packaging of the dispenser with other articles which may be used in procedures requiring its use.

A primary object of the invention is to provide a measuring dispenser of the dip type which is economical to fabricate, more efficient and satisfactory in use, adaptable to a wide variety of applications and unlikely to malfunction.

Another object of the invention is to provide a dip type measuring dispenser which can be easily employed by persons who may be handicapped by shaky hands and/or poor vision.

A further object of the invention is to provide a dip type measuring dispenser affording means for simply measuring and dispensing different quantities of liquid.

Another object of the invention is to provide a dip type dispenser of shaped tubing having simple means to stabilize the same in use.

An additional object of the invention is to provide a dip type dispenser possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein one but not necessarily the only form of embodiment of the invention is shown, FIG. 1 is an elevational view of one embodiment of a dispenser in accordance with the invention;

FIGS. 2 and 3 are similar views of modifications of the device shown in FIG. 1; and FIG. 4 illustrates the utility of the design of the modification of FIG. 3 for packaging the same with other articles.

Like parts are indicated by similar characters of reference throughout the several views.

DESCRIPTION OF PREFERRED EMBODIMENTS OF THE INVENTION

Referring to FIG. 1 of the drawings, the embodiment of the invention there shown illustrates a measuring dispenser 10 of a dip type. The dispenser 10 may be formed of plastic or glass tubing, for example, and shaped, as indicated, into a rigid structure. In fabrication thereof from a length of straight tubing only the ends thereof are shaped, the same being reversely bent to produce U-shaped measuring segments 12 and 14, respectively to either end of a straight line tube segment 16. As seen the measuring segment 12 terminates in an outwardly bent lip portion 18 directed generally at right angles to the line of the intermediate tube segment 16. Moreover, dependent from the lower edge of the lip portion 18 is a hook-like catch portion 20. The measuring segment 14, similarly to segment 12, terminates in an oppositely and outwardly directed lip portion 22 embodying a catch portion 24. As seen in FIG. 1 the catch portion 24 is upwardly directed.

It will be obvious that when the device is inverted, and the segment 14 employed to measure and dispense, the catch portion 24 will depend relative lip portion 22 to serve its intended purpose. Note, in the embodiment of FIG. 1, that all portions of the dispenser 10 occupy a single plane. Also, the reversely bent portion of the tubing which creates the measuring segment 14 is longer than that forming the segment 12, so, for example, the segment 14 may have twice the liquid capacity in its interior as the segment 12. Of course, it is obvious that the capacity of the respective segments, 12 and 14, may be established at any desired precise level.

In use of the dispener 10 to take urine, for example, from a bottle or other receptacle, in a measured amount, and introduce such measured amount into a test cup, one need only dip one end portion of the device 10 (for example segment 12) into the bottle of urine and in lifting the same from the bottle only that amount of urine will remain in the tubing which corresponds to the segment 12 capacity. In the process the inverted hook-like form of segment 14 may receive a finger or fingers of the user, facilitating a steady control of the dispenser in dipping, lifting and carrying the same and the contained urine to the test cup. To introduce the urine in segment 12 into the test cup so there is no spillage, the grasp of segment 14 facilitates initially hooking catch portion 20 over the lip of the test cup and a guided control of the device to see that its contents are completely poured into the cup as the device 10 is tipped, as required for discharge of its contents.

FIG. 2 of the drawings shows the device 10 configured in outline similarly to the device of FIG. 1. However, the tubing of FIG. 1 is of uniform diameter in its segments 12, 14 and 16. Also the depth of its respective segments 12 and 14 differ to obtain their required differing capacity. By contrast the segments 12 and 14 of the device 10 as shown in FIG. 2 have segments 12 and 14 of equal depth but of differing capacity by virtue of having the tubing in one segment of smaller bore diameter. This is easily achieved in what is an obvious manner and is therefore not further described.

It will be seen that in case of the urine test first described, where differing amounts of urine and water must be mixed, the respective mixing segments 12 and 14 can be arranged to have the capacity to handle the respective precise amounts of liquid required.

FIGS. 3 and 4 of the drawings shows the device of FIGS. 1 or 2 modified to have one shaped end bent so the plane of the measuring segment 14, for example, positions at right angles to the plane of the segments 12 and 16. As seen in FIG. 4, this facilitates packaging the device 10 in the same box 28 with a bottle of tablets 30 as used for urine tests. Thus the segments 14 and 16 of the device 10 may position in flush abutment to one side of the bottle 30 while the hook-like lower measuring segment 12 may position over the shoulder and to one side of the neck of the bottle.

The various advantages and benefits of the invention are believed self-evident from the foregoing.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. A dip type measuring dispenser consisting of a tubular structure, said structure including an intermediate straight segment of tubing having extensions to either end the remote end portion of each of which is formed into a hook shaped configuration to provide a chamber to either end thereof an opening to which is formed at the adjacent projected end of said tubular structure, said chambers thereby providing a measuring segment of said tubular structure to either end thereof, each said chamber being composed of two branches connected by a base portion the contents of which will have a prescribed volume and an opening to which chamber is provided by the open end of the hook shaped end portion to provide thereby that the introduction of a hook shaped end portion of said structure into a body of fluid will inherently introduce therein a prescribed volume of said fluid.

2. A dispenser as in claim 1 wherein said measuring segments are so disposed as to be co-planar.

3. A dispenser as in claim 1 characterized by said measuring segments being disposed in angularly related planes.

4. A dispenser as in claim 3 wherein said angularly related planes are disposed generally at right angles to each other.

5. A dispenser as in claim 1 characterized by said tubular structure having the bores of said hook shaped extensions arranged to differ in diameter.

6. A dispenser as in claim 1 characterized by said chambers being arranged to differ in depth.

7. A dispenser as in claim 1 characterized by the open ends of each of said extensions being bent to project at right angles to said straight segment.

8. A dispenser as in claim 7 characterized by a lip being defined on each said open end of said tubular structure including means for steadying said structure in the course of discharge of the contents of a measuring segment thereof.

9. Apparatus as in claim 8 wherein said steadying means is a catch portion formed integral with the lip defining each open end of said structure.

10. A dip type measuring dispenser consisting of a tubular structure at least one end portion of which is reversely bent to produce thereon a dependent hook shaped extremity the projected end of which is open, said hook shaped extremity forming a chamber composed of two branches connected by a base portion, the contents of which chamber will have a prescribed volume and an opening to which chamber is provided by the open end of said hook shaped extremity to provide thereby that the introduction of said hook shaped extremity into a body of fluid will inherently introduce in said extremity a prescribed volume of said fluid, the projected end of said hook shaped extremity being bent to project at substantially right angles to the adjacent portion of said tubular structure and including thereon means for stabilizing the setting of said structure in the course of discharging the contents of said chamber.

* * * * *